US005529338A

United States Patent [19]

Thompson

[11] Patent Number: 5,529,338

[45] Date of Patent: Jun. 25, 1996

[54] ONE PIECE AUTOMOTIVE AIRBAG SQUIB CONNECTOR

[75] Inventor: Kevin M. Thompson, Hamilton, Ill.

[73] Assignee: Methode Electronics, Inc., Chicago, Ill.

[21] Appl. No.: 277,966

[22] Filed: Jul. 20, 1994

[51] Int. Cl.[6] .................................................... B60R 21/28

[52] U.S. Cl. ...................... 280/741; 102/202.14; 439/596

[58] Field of Search .................................... 280/735, 741; 102/530, 531, 202.14, 202.9; 439/586, 590, 596, 695, 73

[56] References Cited

U.S. PATENT DOCUMENTS 4,721,482 1/1988 Fukuda et al. .......................... 439/586
4,789,348 12/1988 Hampton ................................ 439/596
5,106,326 4/1992 Tsuji et al. ............................. 439/596
5,200,574 4/1993 Cunningham et al. ................. 280/735

*Primary Examiner*—Paul N. Dickson
*Attorney, Agent, or Firm*—David L. Newman

[57] ABSTRACT

A method of constructing an automotive airbag squib connector housing by injecting plastic into a single mold. The single mold provides for the formation of a bottom section, a top cover section, and a lock section. During the molding process, a pair of molding runners connect the bottom section to the top cover section. Likewise, the top cover section is connected to the lock section and where the two sections connect together a notch is formed. Once the sections are molded, they are used to construct an automotive airbag squib connector housing.

4 Claims, 2 Drawing Sheets

ONE PIECE AUTOMOTIVE AIRBAG SQUIB CONNECTOR

BACKGROUND OF THE INVENTION

This invention pertains to an automotive airbag squib connector, and in particular to a method of molding the connector housing as one piece instead of several pieces.

Squib connectors which utilize plastic connector housings are widely used in the automotive airbag industry. Squib connectors are generally used to connect sensors at remote ares of the automobile to the detonation device of an airbag. Normally, three different piece-types are used in the construction of a squib connector housing. To make the squib connector housing, the three different piece-types are molded separately and then assembled together. The separate molding of each of the three different piece-types can be very expensive. For example, the separate molding of one piece-type can result in its over-production unless an inventory tracking system is implemented to ensure that no more than the quantity needed is actually produced. In addition, separate handling is required while molding each of the three different piece-types. Likewise, molding equipment must be re-tooled in order to manufacture each of the different piece-types.

In view of the above, it is an object of the present invention to eliminate the need to maintain an inventory tracking system to ensure that only correct quantities of each piece-type are manufactured.

Another object of the invention is to keep together only those piece-types needed in the assembly of one squib connector housing.

It is also an object of the invention to reduce the amount of handling and re-tooling needed to manufacture the piece-types used in assembling automotive airbag squib connector housings.

SUMMARY OF THE INVENTION

In one form of the invention, an automotive airbag squib connector housing is constructed by injecting plastic into a single mold. The mold provides for the formation of a bottom section, a top cover section, and a lock section. When the sections are molded together, a pair of molding runners connects the bottom section to the top cover section. Likewise, the top cover section is connected to the lock section. Once the molding process is finished, the sections are snapped together to form an automotive airbag squib connector housing.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a presently preferred embodiment of the present invention, wherein like numerals in the various figures pertain to like elements, and wherein.

DETAILED DESCRIPTION OF THE PRESENTLY PREFERRED EMBODIMENTS

Figure 1:
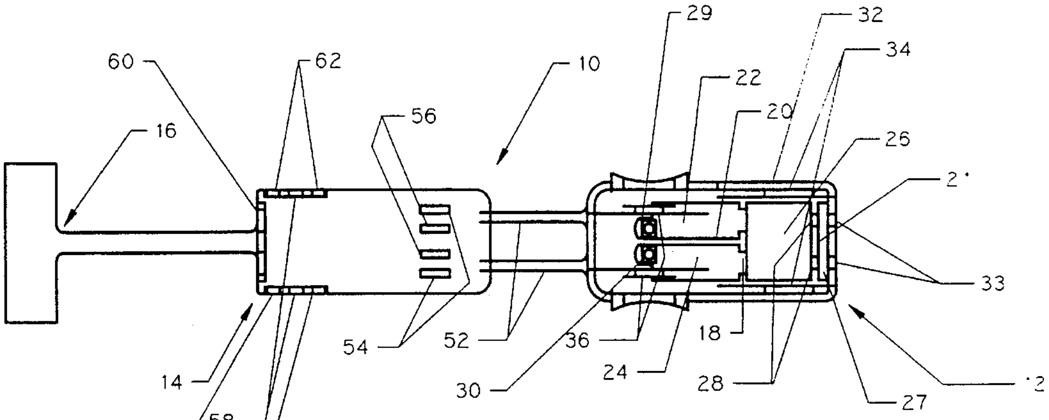
FIG. 1 is a top view of a molded airbag squib connector housing.

Referring to the drawing, and particularly to FIG. 1, a molded plastic airbag squib connector housing 10 is depicted with a bottom section 12, a top cover section 14 and a lock section 16.

The bottom section 12 is generally rectangular in shape and has a cavity 18. The cavity 18 is divided by a first partition 20 and a second partition 21 into a first chamber 22, a second chamber 24, a third chamber 26, and an end reinforcement cavity 27. The first chamber 22, second chamber 24, and the end reinforcement cavity 27 are generally rectangular in shape. Similarly, the third chamber 26 is generally square in shape. The second partition 21 within the cavity 18 has two U-shaped chamber access slots 28 which allow passage from the end reinforcement cavity 27 to the third chamber 26. Furthermore, located at one end of the first chamber 22 is a first recess 29. Likewise, located within the second chamber 24 is a second recess 30.

Along the outside of the bottom section 12 is a wall 32. The wail 32 extends above the bottom section 12 and has two U-shaped cavity access slots 33 at one end of the bottom section. Adjacent to the wail 32 are two top cover mounting slots 34 which traverse through the bottom section 12. Similarly, adjacent to the first recess 29 and the second recess 30 are two locking pin access slots 36 which traverse through the bottom section 12.

Figure 2:
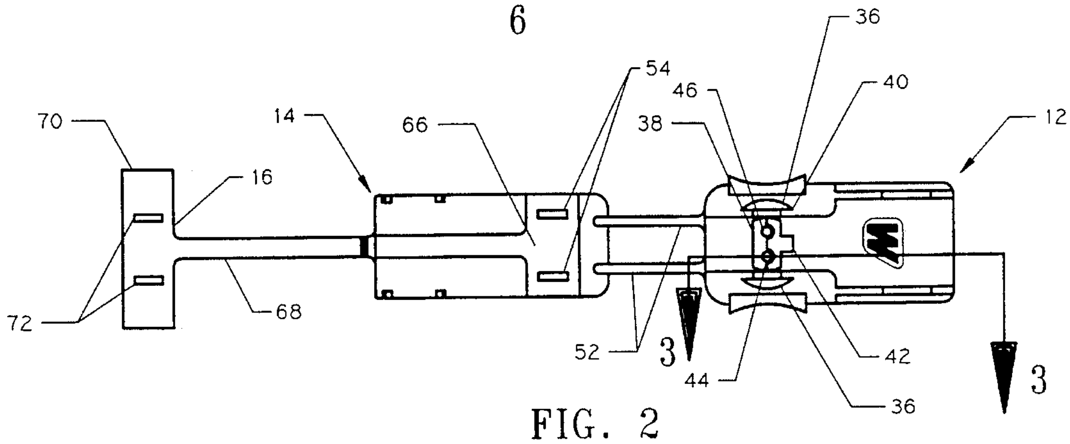
FIG. 2 is a bottom view of the molded airbag squib connector housing.

Referring to FIG. 2, mounted underneath the bottom section 12 is a male insert 38 and two holding pins 40. The male insert 38 is located between the two locking pin access slots 36. Conversely, the two holding pins 40 are mounted adjacent to the locking pin access slots 36 on both sides of the male insert 38. Attached along one side of the male insert 38 is a key 42. Furthermore, located on the end of the male insert 38 is a first male pin receiving port 44 and a second male pin receiving port 46.

Figure 3:
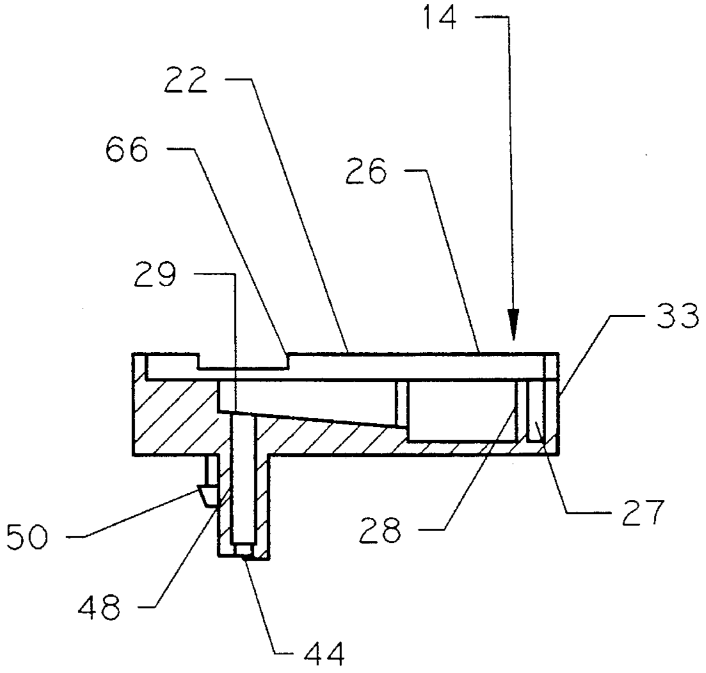
FIG. 3 is a cross-sectional side view of the molded airbag squib connector housing taken along line 3—3 of FIG. 2.

Turning to FIG. 3, extending from the first male pin receiving port 44 to the first recess 29 is a first bore 48. Similarly, although not shown, extending from the second male pin receiving port to the second female contact mounting recess is a second bore.

Figure 4:
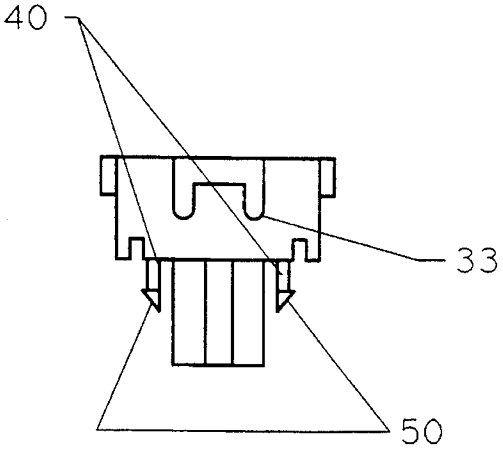
FIG. 4 is an end view of the molded airbag squib connector housing.

Referring now to FIG. 4, on the end of each of the holding pins 40 is a lip 50. Each lip 50 extends outwardly and away from the male insert 38 for the purpose of retention in a mating part.

Turning back to FIG. 2, extending from the bottom section 12 and connected to the top cover section 14 are two molding runners 52. The molding runners 52 serve no purpose other than to facilitate the simultaneous molding of all of the sections to the molded airbag squib connector housing 10.

As depicted in FIG. 1, the top cover section 14 is molded so that it will fit within the wall 32 of the bottom section 12 and thus enclose the cavity 18. The top cover section 14 provides two access holes 54, two tabs 56 located between the access holes 54, two top cover mounting pins 58, and an end reinforcement 60. Both of the top cover mounting pins

Figure 5:
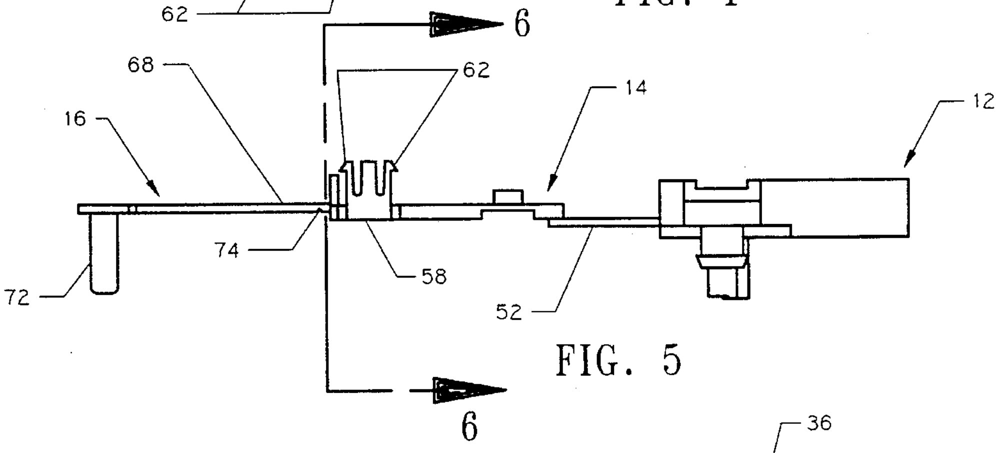
FIG. 5 is a side view of the molded airbag squib connector.
Figure 6:
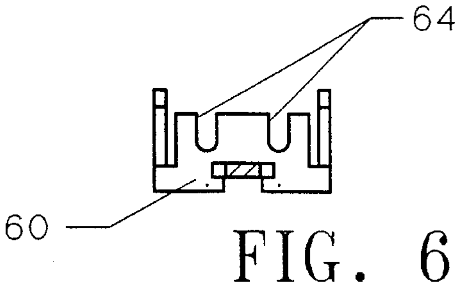
FIG. 6 is an end view of the molded airbag squib connector housing taken along line 6—6 of FIG. 5.

58 are identical. As shown in FIG. 5, each top cover mounting pin 58 has two latching hooks 62. Furthermore, referring to FIG. 6, the end reinforcement 60 of the top cover section 14 has two U-shaped pass-through slots 64. As disclosed in FIG. 2, the top cover section 14 has an indented portion 66 which is adapted to accommodate the lock section 16.

During the molding process, the top cover section 14 is connected to the lock section 16. The lock section 16 has a base 68 and a head 70 which together form a T-shape. On the head 70 of the lock section 16 are two locking pins 72. Furthermore, as shown in FIG. 5, a V-shaped notch 74 is present where the base 68 of the lock section 16 attaches to the top cover section 14.

Simultaneous molding of all sections needed to manufacture one automotive airbag squib connector housing is provided by the connecting of the bottom section 12, via the molding runners 52, to the top cover section 14 which is connected to the lock section 16. In the preferred embodiment, the thermoplastic polymer material used in molding the squib connector housing consists of seventy percent glass-filled nylon.

After simultaneously molding the sections to an entire squib connector housing, the sections can readily be snapped together. However, referring to FIG. 1, prior to assembly of the squib connector housing 10, contact wires are inserted through the cavity access slots 33, the chamber access slots 28, and two bores which run through an electrical choke block placed within the third chamber 26. The end of the contact wires are attached to female contacts mounted within both the first recess 29 and the second recess 30 of the bottom section 12.

Referring back to FIG. 5, snapping the sections of the squib connector housing 10 together is accomplished by bending the molding runners 52 so that the top cover mounting pins 58 of the top cover section 14 align with the top cover mounting slots 34 of the bottom section 12. The top cover section 14 is then firmly pressed onto the bottom section 12 so that the top cover mounting pins 58 slide through the top cover mounting slots 34 and the latching hooks 62 catch on the underneath of the bottom section.

Referring to FIG. 2, the lock section 16 is utilized whenever the squib connector holding pins 40 of the, bottom section 12 are to be prevented from bending inwardly toward the male insert 36. When the top cover section 14 is mounted on the bottom section 12, the locking pins 72 of the lock: section 16 are inserted within the access holes 54 of the top cover section 14. The lock section 16 is then pressed against the top cover section 14 so that the base 68 and the head 70 of the lock section fits within the indented portion 66 of the top cover section. Pressing the lock section 16 onto the top cover section 14 will cause the lock section locking pins 72 to extend through the locking pin access slots 36 of the bottom section 12 and thus the locking pins will occupy the space between the male insert 38 and the holding pins 40. Furthermore, referring to FIG. 5, the bending of the locking section 16 onto the top of the top cover section 14 will result in the locking section either bending or breaking from the top cover section 14 in the area of the notch 74.

Once fully assembled, the squib connector housing 10 may be connected to an airbag detonator by insertion of the male insert 38. When the male insert 38 is connected, male contact pins from the airbag detonator will extend within the first male pin receiving port 44 and the second male pin receiving port 46. The male contact pins will form an electrical connection with corresponding female contacts mounted within the bottom section 12.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A squib connector comprising:

a) a bottom section having a holding pin and a male insert with a space therebetween, said space adjacent a pin access slot of said bottom section;

b) a top cover section connected with said bottom section and having an access hole aligned with said pin access slot; and c) a lock section inserted through said access hole and said pin access slot and occupying said space between said holding pin and said male insert, whereby bending of said holding pin is prevented, said lock section connected with said top cover section.

2. The squib connector of claim 1, wherein said bottom section, top cover section, and lock section are molded as one piece of thermoplastic polymer material.

3. The squib connector of claim 1, including at least one molding runner connecting said bottom section and said top cover section.

4. The squib connector of claim 1, wherein after assembly of said connector the top section is disconnected from the bottom section.

* * * * *